(12) United States Patent
Negrillo et al.

(10) Patent No.: US 9,633,392 B2
(45) Date of Patent: Apr. 25, 2017

(54) INTEGRATED FINDING EXPERIENCE SYSTEMS AND METHODS

(75) Inventors: Belmer Perella Garcia Negrillo, San Francisco, CA (US); Jonas Klink, White Plains, NY (US); Andrew David Palmer, Campbell, CA (US); Brent Curtis Leffew, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 556 days.

(21) Appl. No.: 13/441,455

(22) Filed: Apr. 6, 2012

(65) Prior Publication Data
US 2012/0265647 A1 Oct. 18, 2012

Related U.S. Application Data

(60) Provisional application No. 61/474,971, filed on Apr. 13, 2011.

(51) Int. Cl.
*G06Q 30/06* (2012.01)
*G06F 17/30* (2006.01)

(52) U.S. Cl.
CPC ... *G06Q 30/0641* (2013.01); *G06F 17/30967* (2013.01); *G06F 17/30991* (2013.01)

(58) Field of Classification Search
USPC .............................. 705/26.62; 715/825, 845
See application file for complete search history.

(56) References Cited

U.S. PATENT DOCUMENTS

| | | | |
|---|---|---|---|
| 6,031,530 A * | 2/2000 | Trueblood | 715/791 |
| 6,760,720 B1 | 7/2004 | De Bellis | |
| 7,100,123 B1 | 8/2006 | Todd et al. | |
| 7,669,142 B2 * | 2/2010 | Ray et al. | 715/825 |
| 7,689,933 B1 * | 3/2010 | Parsons | 715/838 |
| 7,692,658 B2 * | 4/2010 | Moore | 345/473 |
| 7,873,622 B1 * | 1/2011 | Karls et al. | 707/707 |
| 7,900,228 B2 * | 3/2011 | Stark et al. | 725/45 |
| 8,082,516 B2 * | 12/2011 | Vaca et al. | 715/781 |
| 8,214,766 B1 * | 7/2012 | Berger et al. | 715/838 |
| 8,316,320 B2 * | 11/2012 | Relyea et al. | 715/817 |

(Continued)

OTHER PUBLICATIONS

"International Application Serial No. PCT/US2012/032706, International Search Report mailed Jun. 20, 2012", 2 pgs.

(Continued)

*Primary Examiner* — Kathleen Palavecino
*Assistant Examiner* — Abby Flynn
(74) *Attorney, Agent, or Firm* — Maschoff Brennan

(57) ABSTRACT

An integrated finding experience is a workflow configured to facilitate a search by a user for one or more items among many items (e.g., an inventory of items). An integrated finding experience machine may provide one or more user interfaces that support the workflow in presenting information differently as the user progresses through a search process (e.g., a finding experience) with respect to a database (e.g., storing information regarding one or more items). For example, the workflow may include various stages of a search process from defining a query, to refining the query, to visually scanning search results, to displaying details of one or more selected search results, to comparing selected search results to each other. Each stage may have a specialized user interface configured to facilitate one or more user activities pertinent to that stage.

14 Claims, 9 Drawing Sheets

(56) References Cited

U.S. PATENT DOCUMENTS

| | | | |
|---|---|---|---|
| 9,384,507 B1* | 7/2016 | Bathurst | G06F 3/0484 |
| 2002/0116276 A1* | 8/2002 | Ottley | 705/26 |
| 2006/0085741 A1* | 4/2006 | Weiner et al. | 715/517 |
| 2006/0277167 A1* | 12/2006 | Gross | G06F 17/30905 |
| 2008/0022308 A1* | 1/2008 | Garcea | H04N 5/44543 |
| | | | 725/46 |
| 2009/0254455 A1 | 10/2009 | Rothey et al. | |
| 2011/0191210 A1* | 8/2011 | Blackhurst et al. | 705/27.1 |

OTHER PUBLICATIONS

"International Application Serial No. PCT/US2012/032706, Written Opinion mailed Jun. 20, 2012", 5 pgs.

* cited by examiner

INTEGRATED FINDING EXPERIENCE SYSTEMS AND METHODS

RELATED APPLICATION

This application claims the priority benefit of U.S. Provisional Patent Application No. 61/474,971, filed Apr. 13, 2011, which is incorporated herein by reference in its entirety.

TECHNICAL FIELD

The subject matter disclosed herein generally relates to the processing of data. Specifically, the present disclosure addresses systems and methods of facilitating (e.g., generating, presenting, or updating) a user interface (e.g., graphical user interface).

BACKGROUND

A product may be available for purchase from a seller, and the seller may seek to merchandise one or more items as instances of the product. The product may take the form of a good or a service. Examples of goods include physical items (e.g., a digital camera or a car) and information items (e.g., digital media). Examples of services include human services (e.g., contracted work) and automated services (e.g., subscriptions). Other examples of products include authorizations (e.g., access to services, licenses, or encryption keys).

In merchandising an item, the seller may use a network-based system to present an advertisement of the item to a user of the network-based system (e.g., to a potential buyer of the item). Examples of network-based systems include commerce systems (e.g., shopping websites), publication systems (e.g., classified advertisement websites), listing systems (e.g., auction websites), and transaction systems (e.g., payment websites). Examples of advertisements include banner advertisements, sidebar advertisements, pop-up advertisements, and tool tips. Furthermore, an advertisement of the item may take the form of a search result referencing the item, a listing for the item (e.g., within a list of items available for purchase), a review of the item, a comment on the item, or any suitable combination thereof.

BRIEF DESCRIPTION OF THE DRAWINGS

Some embodiments are illustrated by way of example and not limitation in the figures of the accompanying drawings.

FIG. 2 is a diagram of a second view of the integrated finding experience, according to some example embodiments.

FIG. 3 is a diagram of a third view of the integrated finding experience, according to some example embodiments.

DETAILED DESCRIPTION

Example methods and systems are directed to an integrated finding experience, which may be facilitated by an integrated finding experience machine. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured (e.g., by one or more modules) to present an integrated finding experience to a user of the machine. The machine may form all or part of a network-based system, and the user may be a user of the network-based system. An integrated finding experience is a workflow configured to facilitate a search by a user for one or more items among many items (e.g., an inventory of items). The integrated finding experience may provide (e.g., generate, present, or update) one or more user interfaces (e.g., graphical user interfaces) that support the workflow in presenting information in one or more ways as the user progresses through a search process (e.g., a finding experience) with respect to a database (e.g., storing information regarding one or more items). For example, the workflow may include various stages of a search process from defining a query, to refining the query, to visually scanning search results, to displaying details of one or more selected search results, to comparing selected search results to each other. Each stage may be associated with a predetermined user interface (e.g., a view of a graphical user interface) configured to facilitate one or more user activities pertinent to that stage. To support the workflow, one or more user interfaces made be implemented as a web page that dynamically changes (e.g., using Asynchronous JavaScript and XML (AJAX)) from stage to stage (e.g., from view to view) within the workflow.

Figure 1:
FIG. 1 is a diagram of a first view of an integrated finding experience, according to some example embodiments.

FIG. 1 is a diagram of a first view 100 of an integrated finding experience, according to some example embodiments. The first view 100 may be presented (e.g., to a user) using some or all of a display (e.g., an electronic graphical display). In some example embodiments, multiple displays are used to present the first view 100. The display is configured to present one or more views (e.g., the first view 100) of the integrated finding experience, and the display may be configured to present a cursor (e.g., an arrow or a hand shape) based on control input (e.g., mouse movement or touchscreen inputs) received from the user by a device communicatively coupled to the display.

As shown in FIG. 1, the first view 100 includes a search definition panel 110 on the left edge of the first view 100. The search definition panel 110 includes various elements that are selectable by the user as search criteria to define a query of a database that stores information regarding items. For example, the search definition panel 110 may include an element for specifying one or more categories of items. Examples of categories include "Clothing, Shoes & Accessories," "Men's Shoes," "Children's Clothing & Shoes," "Sporting Goods," and "Team Sports." In some example embodiments, the search definition panel 110 may include an element for specifying additional categories.

As another example, a profile (e.g., a set) of preselected search criteria may be stored (e.g., as a data file corresponding to the user) in the database, and the search definition panel 110 may include an element for specifying a profile (e.g., from among multiple available profiles of preselected search criteria). The search definition panel 110 may also include an element for initiating creation of a new profile.

As yet another example, the search definition panel 110 may include an element for selecting one or more sizes of items. For instance, the element may support selection of men's shoe sizes ("6," "6.5," or "7"). In some example embodiments, the search definition panel 110 may include an element for displaying additional sizes.

As a further example, the search definition panel 110 may include an element for specifying one or more styles of items. Examples of styles include "Athletics," "Athletic-Inspired," "Casual, Comfort," and "Not Specified." In some example embodiments, the search definition panel 110 may include an element for displaying additional styles.

As a further example, the search definition panel 110 may include an element for specifying one or more conditions of items. For example, the element may support selection of one or more descriptions of an item's condition, such as "New," "Used," and "Not Specified." In some example embodiments, the search definition panel 110 may include an element for displaying additional descriptions of conditions.

As a still further example, the search definition panel 110 may include an element for specifying one or more prices or a range of prices of items. The element may include a field for submitting a minimum price and a field for submitting a maximum price.

The search definition panel 110 may include, for example, an element for specifying one or more colors of items. Examples of colors include "Black," "Blue," "Brown," "White," and "Not Specified." In some example embodiments, the search definition panel 110 includes an element for displaying additional colors.

As shown in FIG. 1, the first view 100 also includes a presentation 120 of search results. The search results are returned from the database based on (e.g., as a consequence of) execution of the query defined in the search definition panel 110. Each of the search results references an item and provides some information about that referenced item. Accordingly, the first view 100 of the integrated finding experience may conveniently present to the user the search results from the query in visual proximity to (e.g., in the same first view 100 as) the search criteria used in the query.

A particular search result 121 among the search results presents some information about an item (e.g., a pair of shoes). For example, the particular search result 121 may include an image of the item, a price of the item (e.g., "$29.99"), a title of the item (e.g., "Adidas® SAMBA® Shoes JUNIOR BOY'S Black White NWT"), a size of the item (e.g., "6.5"), a condition of the item (e.g., "Refurbished"), a shipping cost of the item (e.g., "$9.95 shipping"), or any suitable combination thereof.

Figure 2:
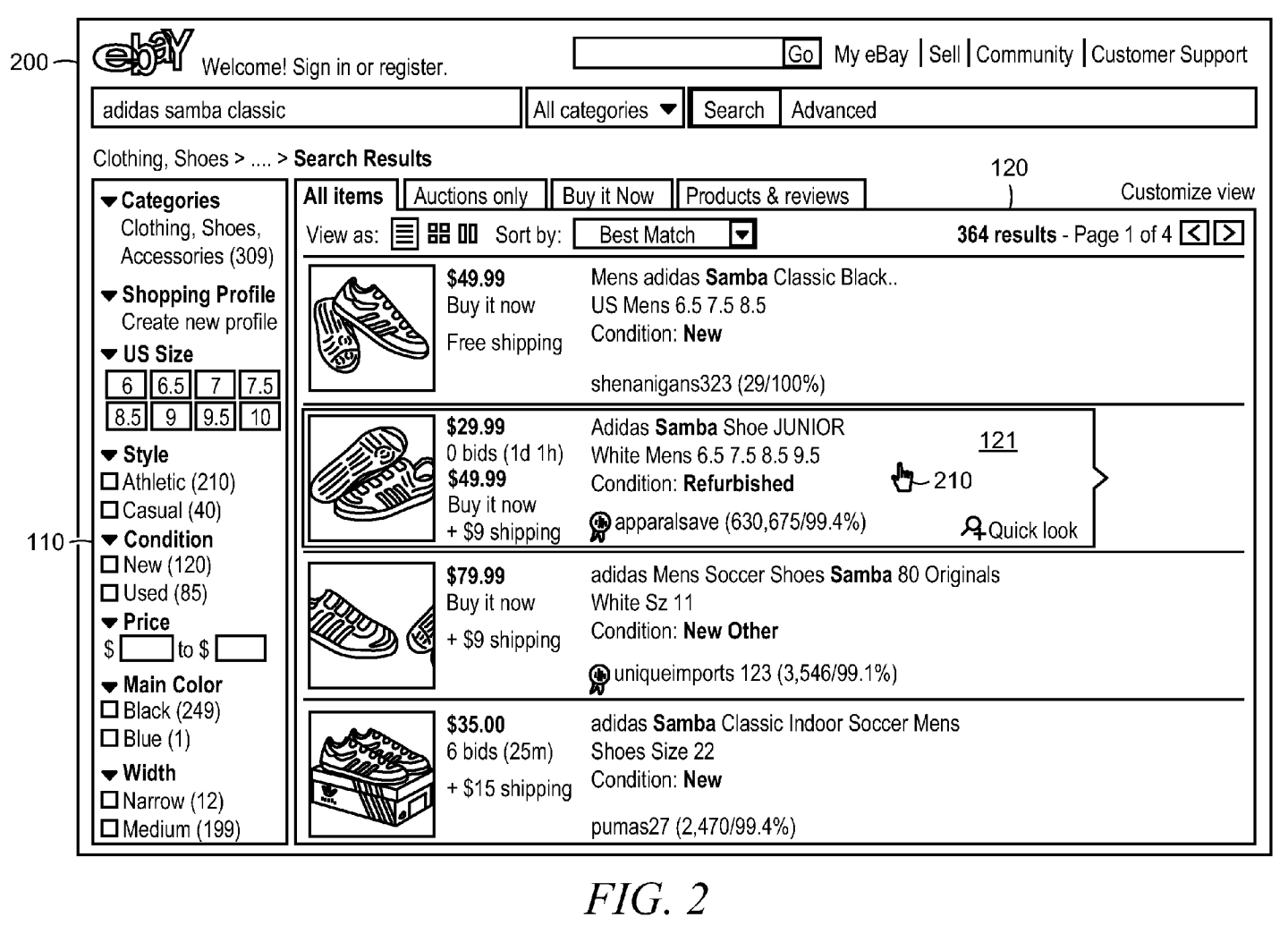

FIG. 2 is a diagram of a second view 200 of the integrated finding experience, according to some example embodiments. The second view 200 includes the search definition panel 110 of FIG. 1, as well as the presentation 120 of search results of FIG. 1. A cursor 210, however, is positioned over the particular search result 121 among the search results. The second view 200 highlights the particular search result 121 in response to the position of the cursor 210. This highlighting of the particular search result 121 may include presenting the particular search result 121 using a predetermined color, shape, border (e.g., outline), animated effect, or any suitable combination thereof. Although the particular search result 121 displays some information about an item, the particular search result 121 is configured to function as an element for initiating a presentation of further information about the item. For example, a cursor event (e.g., a mouse click or a touch) corresponding to this position over the particular search result 121 may initiate a transition from the second view 200 to a further view of the integrated finding experience (e.g., the view discussed below with respect to FIG. 3).

Figure 3:
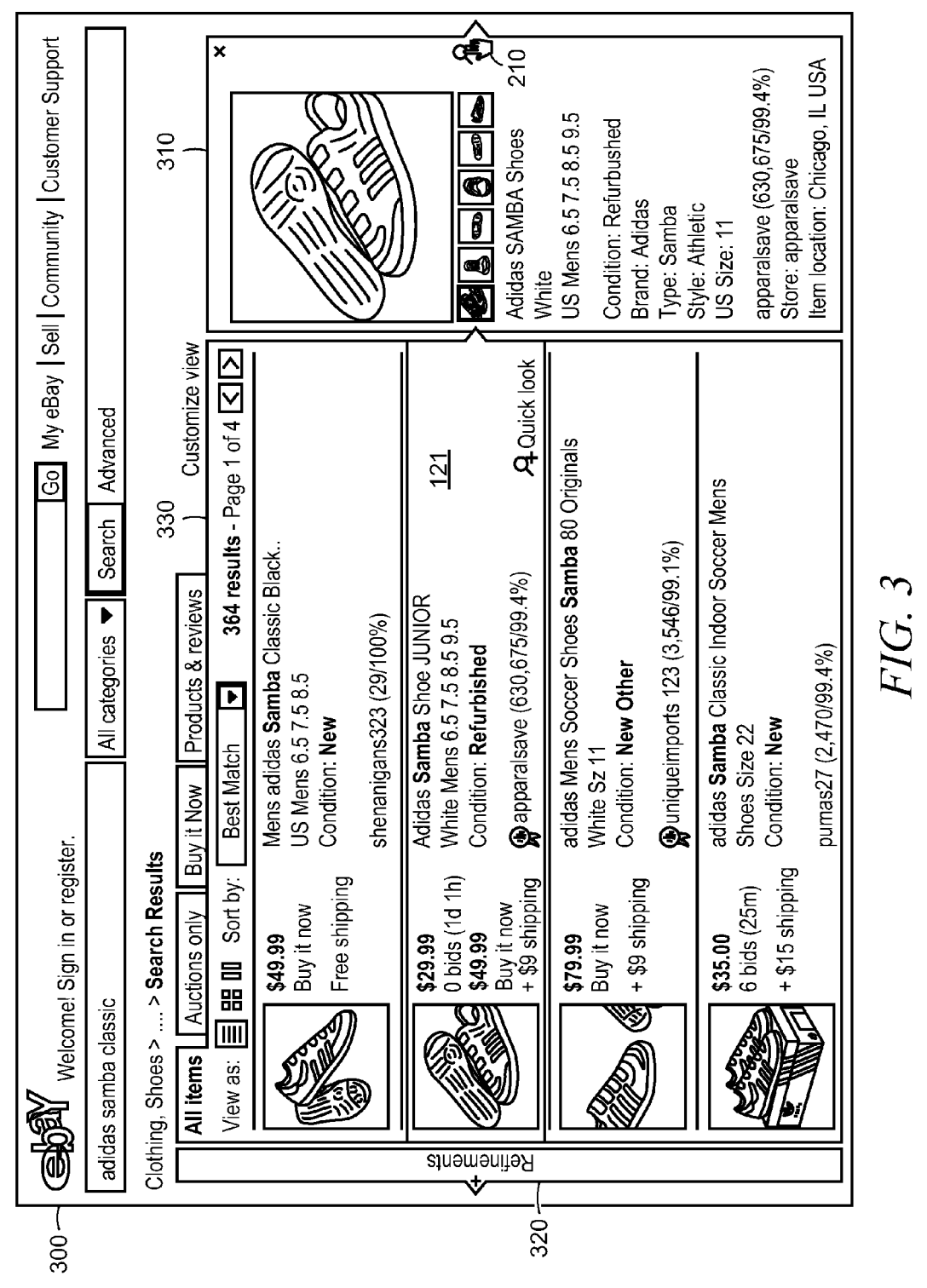

FIG. 3 is a diagram of a third view 300 of the integrated finding experience, according to some example embodiments. The third view 300 includes an item detail panel 310 on the right edge of the third view 300. The item detail panel 310 corresponds to the item referenced by the particular search result 121. To accommodate inclusion of the item detail panel 310, the third view 300 replaces the search definition panel 110 of FIG. 2 with a search refinement bar 320 on the left edge of the third view 300. In some example embodiments, however, the third view 300 preserves the search definition panel 110 of FIG. 2 and includes the item detail panel 310, without replacing the search definition panel 110 with the search refinement bar 320.

As shown, the third view 300 includes a first modified presentation 330 of the search results. For example, the first modified presentation 330 of the search results may be a resized version (e.g., a narrowed version) of the presentation 120 of the search results shown in FIG. 2. Accordingly, some information shown in the presentation 120 of the search results of FIG. 2 may be omitted from the first modified presentation 330 of the search results of FIG. 3.

In the first modified presentation 330 of the search results, the particular search result 121 may be presented with a shape that indicates that the item referenced by the particular search result 121 is depicted in the item detail panel 310. For example, the shape may include all or part of an arrowhead (e.g., a triangular arrowhead) that points from the particular search result 121 to or toward the item detail panel 310.

The integrated finding experience may implement an animated transition from the second view 200 of FIG. 2 to the third view 300 of FIG. 3. For example, the animated transition may appear to slide the presentation 120 of search results to the left, while shrinking the search definition panel 110 to become the search refinement bar 320 on the left edge of the third view 300 and bringing the item detail panel 310 into view on the right edge of the third view 300. In some example embodiments, the animated transition provides the appearance of shrinking the presentation 120 of the search results while expanding the item detail panel 310 into view. The animated transition from the second view 200 to the third view 300 may be initiated by a cursor event (e.g., a mouse click or a touch) corresponding to the particular search result 121 shown in the second view 200.

The item detail panel 310 includes further information about the item referenced by the particular search result 121 (e.g., information absent from the particular search result).

For example, the item detail panel 310 may include an image of the item, and the image of the item may be larger than the image of the item included in the particular search result 121. Furthermore, the item detail panel 310 may include one or more elements for presenting further images of the item.

The item detail panel 310 may include a brand of the item (e.g., "Adidas®"), a type of the item (e.g., "Samba®" or "Indoor"), a style of the item (e.g., "Athletic-Inspired"), a sub-style of the item (e.g., "Sneakers"), or any suitable combination thereof. Moreover, the item detail panel 310 may include information regarding a seller of the item (e.g., "apparelsave"), a location of the item (e.g., "Chicago, Ill., USA"), a return policy for the item (e.g., "Within 7 days of purchase"), a payment type for the item (e.g., "PayPal accepted"), a description of the item, or any suitable combination thereof.

According to various example embodiments, the item detail panel 310 may include a review of the item (e.g., written by a product expert or submitted by a user), a video depicting the item (e.g., an advertisement, a preview, a usage tutorial, or a maintenance tutorial), interactive content regarding the item (e.g., a three-dimensional model of the item, or a simulation of the item), or any suitable combination thereof. In certain example embodiments, the item detail panel 310 includes information received from a social networking service (e.g., Facebook® or Twitter®), where the information may be pertinent to the item, the user, or both. As examples, the information received from the social networking service may include a message regarding the item (e.g., submitted by a friend of the user), a promotion for the item (e.g., submitted by a seller associated with the user), a demonstration of the item (e.g., submitted by an expert associated with the item), a statistic (e.g., a number of friends of the user who have viewed the item), or any suitable combination thereof. Furthermore, the item detail panel 310 may include suggestions or recommendations for other items, products, or categories of items or products.

As shown in FIG. 3, the cursor 210 of FIG. 2 is positioned over the item detail panel 310 (e.g., over a particular element in the item detail panel 310). A cursor event (e.g., a mouse click or a touch) corresponding to this position over the item detail panel 310 may initiate a transition from the third view 300 to a further view of the integrated finding experience (e.g., the view discussed below with respect to FIG. 4).

Figure 4:
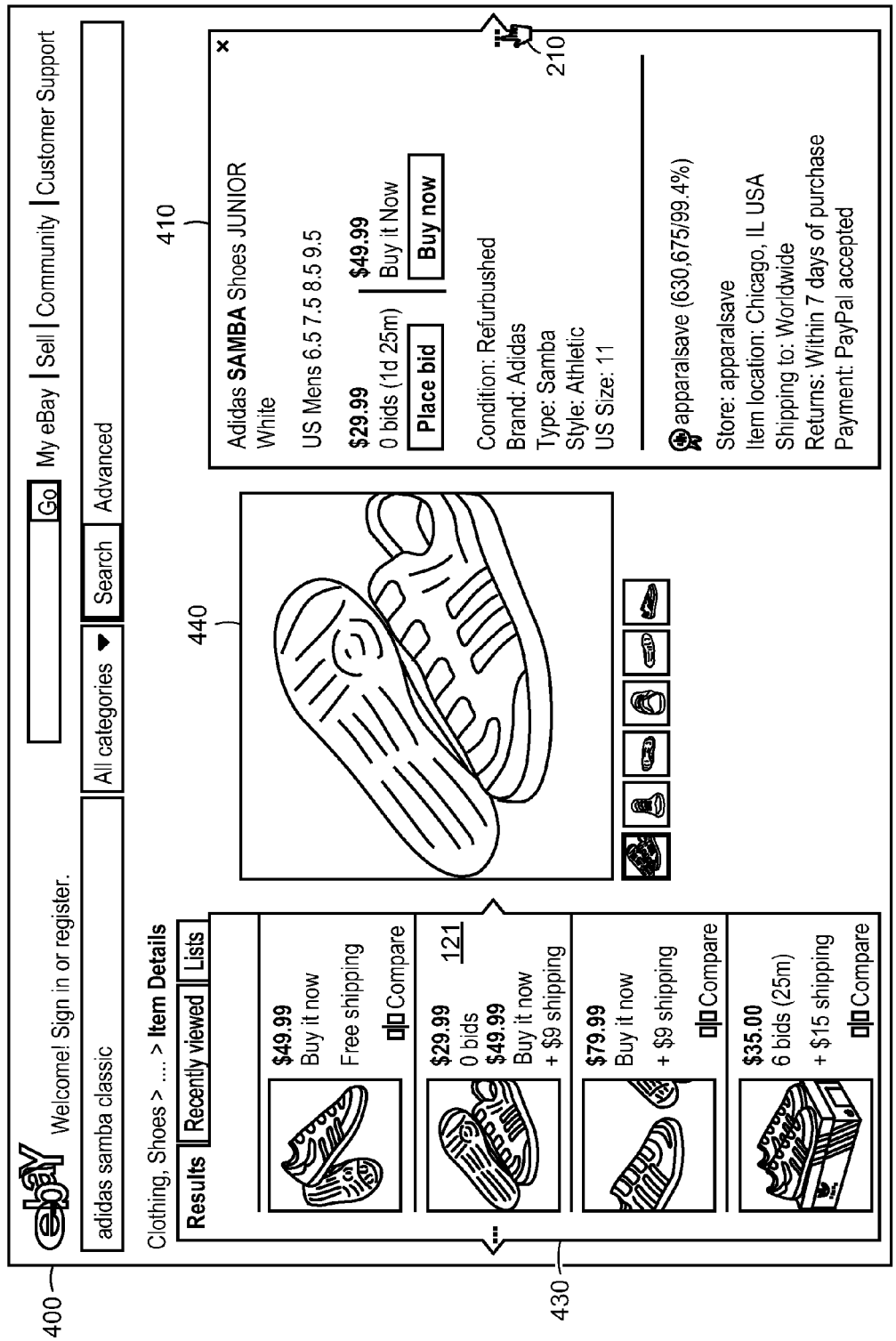
FIG. 4 is a diagram of a fourth view of the integrated finding experience, according to some example embodiments.

FIG. 4 is a diagram of a fourth view 400 of the integrated finding experience, according to some example embodiments. The fourth view 400 includes an item purchase panel 410 on the right edge of the fourth view 400. The item purchase panel 410 corresponds to the item referenced by the particular search result 121 of FIG. 2 and depicted in the item detail panel 310 of FIG. 3. To accommodate inclusion of the item purchase panel 410, the fourth view 400 replaces the search refinement bar 320 of FIG. 3 with a second modified presentation 430 of the search results on the left edge of the fourth view 400.

The second modified presentation 430 of the search results may be a resized version (e.g., a narrowed version) of the first modified presentation 330 of the search results shown in FIG. 3. Accordingly, some information shown in the first modified presentation 330 of the search results of FIG. 3 may be omitted from the second modified presentation 430 of the search results of FIG. 4.

In the second modified presentation 430 of the search results, the particular search result 121 may be presented with a shape that indicates that the item referenced by the particular search result 121 is depicted in the item purchase panel 410. For example, the shape may include all or part of an arrowhead (e.g., a triangular arrowhead) that points from the particular search result 121 to or toward the item purchase panel 410.

In some example embodiments, the fourth view 400 of the integrated finding experience may include an image 440 of the item referenced by the particular search result 121. The image 440 may include an image of the item, and the image of the item may be larger than the image of the item included in the particular search result 121, the item detail panel 310 of FIG. 3, or both.

As above, the integrated finding experience may implement an animated transition from the third view 300 of FIG. 3 to the fourth view 400 of FIG. 4. For example, the animated transition may appear to slide the first modified presentation 330 of the search results to the left, while appearing to move the search refinement bar 320 out of view (e.g., off-screen on a display). Continuing the example, the animated transition may appear to morph the first modified presentation 330 of the search results into the second modified presentation 430 of the search results and slide the second modified presentation 430 of search results to the left edge of the fourth view 400, while bringing the item purchase panel 410 into view on the right edge of the fourth view 400. In some example embodiments, the animated transition provides the appearance of shrinking the first modified presentation 330 of the search results into the second modified presentation 430 of the search results while expanding the item purchase panel 410 into view. The animated transition from the third view 300 to the fourth view 400 may be initiated by a cursor event (e.g., a mouse event or a touch) corresponding to the item detail panel 310 shown in the third view 300.

The item purchase panel 410 includes one or more elements for initiating a purchase (e.g., a commercial purchase transaction) of the item that is shown in the item purchase panel 410, shown in the image 440, or shown in any suitable combination thereof. For example, an element may initiate an electronic storefront operable to make the purchase of the item.

As shown in FIG. 4, the cursor 210 of FIG. 2 is positioned over the item purchase panel 410 (e.g., over a particular element in the item purchase panel 410). A cursor event (e.g., a mouse click or a touch) corresponding to this position over the item purchase panel 410 may initiate a transition from the fourth view 400 to a further view of the integrated finding experience (e.g., the view discussed below with respect to FIG. 5).

Figure 5:
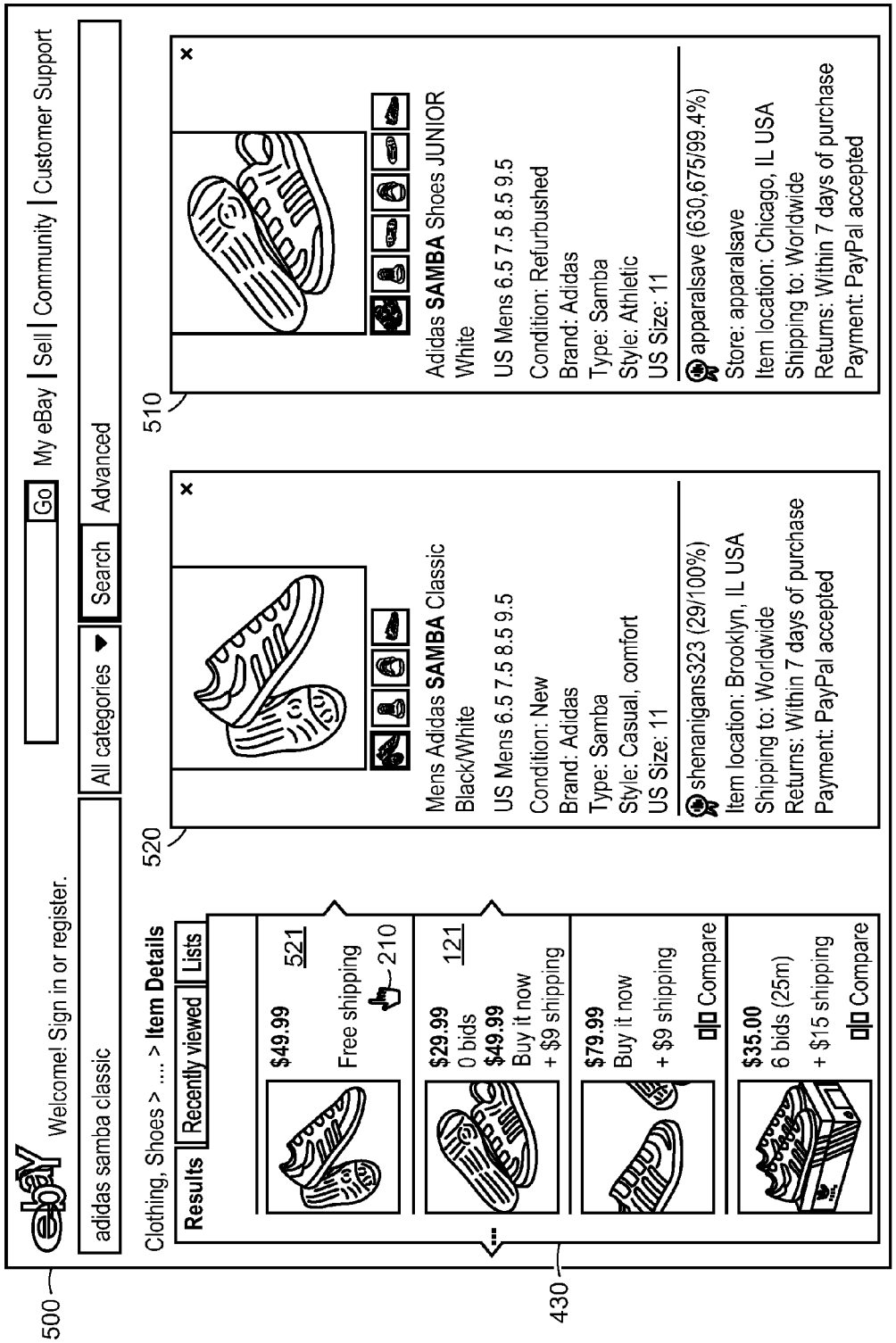
FIG. 5 is a diagram of a fifth view of the integrated finding experience, according to some example embodiments.

FIG. 5 is a diagram of a fifth view 500 of the integrated finding experience, according to some example embodiments. The fifth view 500 includes multiple item detail panels 510 and 520, which may have the same or similar appearance as the item detail panel 310 of FIG. 3. The item detail panels 510 and 520 may be shown side-by-side in the fifth view 500 for convenient visual comparison by the user. Similar to the fourth view 400 of FIG. 4, the fifth view 500 of FIG. 5 presents the second modified presentation 430 of the search results on the left edge of the fifth view 500.

As shown, the second modified presentation 430 of the search results indicates particular search results as being selected (e.g., as indicated by highlighting the particular search results). Selection of one or more search results may be affected by a cursor event (e.g., a mouse click or a touch) corresponding to the one or more search results shown on the display.

Within the fifth view 500, the second modified presentation 430 of the search results may present the particular search result 121 with a shape that indicates that the item referenced by the particular search result 121 is depicted in the item detail panel 510. For example, the shape may include all or part of an arrowhead (e.g., a triangular arrowhead) that points from the particular search result 121 to or toward the item detail panel 510.

In addition, as appearing in the fifth view 500, the second modified presentation 430 of the search results may present a further particular search result 521 with a shape that indicates that the item referenced by the further particular search result 521 is depicted in the item detail panel 520. For example, the shape may include all or part of an arrowhead that points from the further particular search result 521 to or toward the item detail panel 520.

As shown in FIG. 5, the cursor 210 of FIG. 2 is positioned over the further particular search result 521. In response to the position of the cursor 210, the fifth view 500 may highlight the further particular search result 521, present the item detail panel 520 that corresponds to the further particular search result 521, or both. Although the further particular search result 521 displays some information about an item, the further particular search result 521 may be configured to function as an element for initiating a presentation of further information about the item (e.g., presentation of the item detail panel 520).

As above, the integrated finding experience may implement an animated transition from the fourth view 400 of FIG. 4 to the fifth view 500 of FIG. 5. For example, the animated transition may appear to replace the item purchase panel 410 of FIG. 4 with one or more of the multiple item detail panels 510 and 520 (e.g., the item detail panel of FIG. 3). Presentation of the multiple item detail panels 510 and 520 may occur one by one or all at once. In some example embodiments, the animated transition provides the appearance of maintaining the second modified presentation 430 of the search results, while sliding the multiple item detail panels 510 and 520 into view from the right edge of the fifth view 500.

In the fifth view 500, one or more of the multiple item detail panels 510 and 520 may be an element for initiating presentation of an item purchase panel (e.g., the item purchase panel 410 of FIG. 4). For example, the element may initiate presentation of the item purchase panel in response to a user event (e.g., a mouse click or a touch) corresponding to the element.

Figure 6:
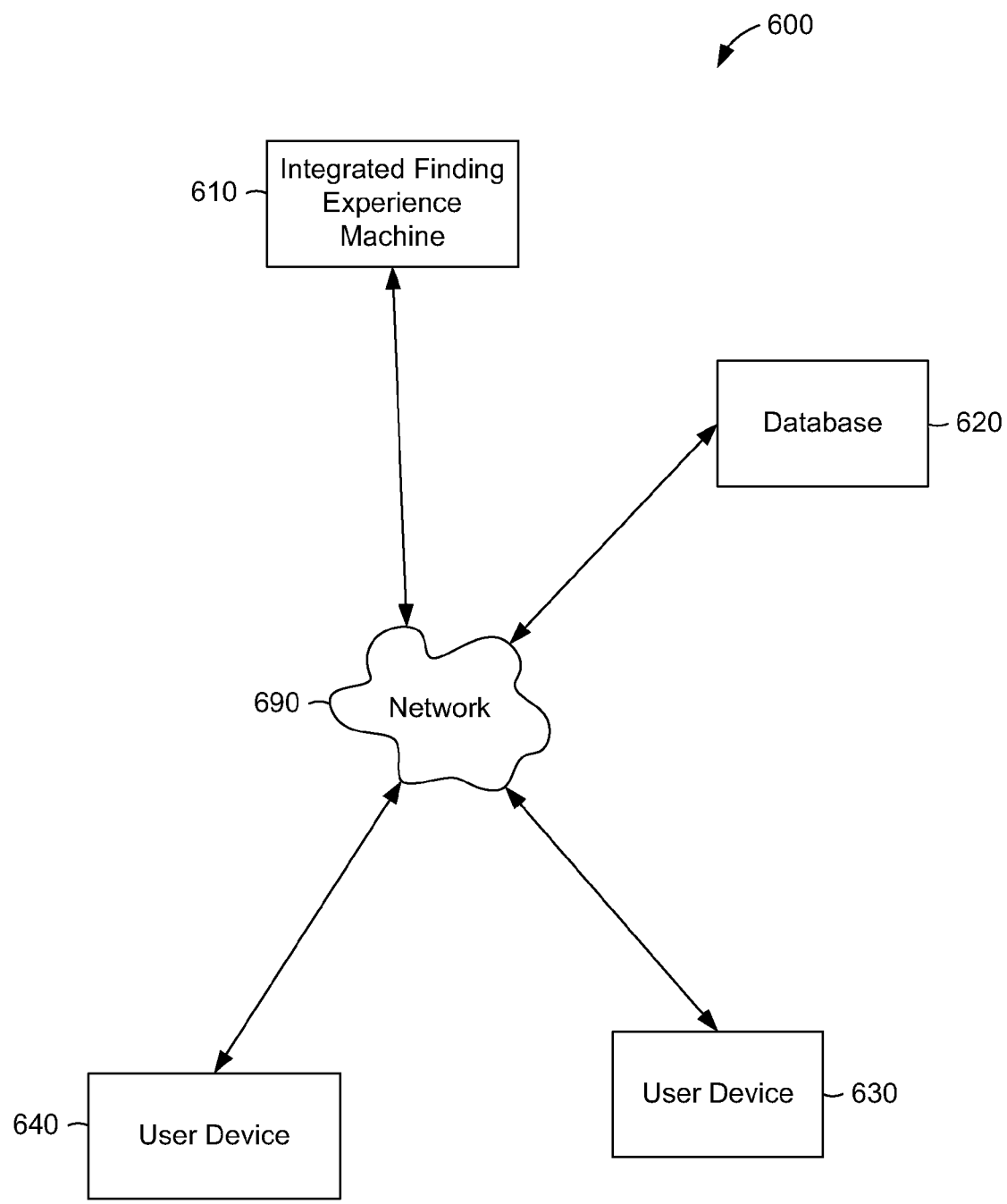
FIG. 6 is a network diagram illustrating a network environment suitable for providing an integrated finding experience, according to some example embodiments.

FIG. 6 is a network diagram illustrating a network environment 600 suitable for providing an integrated finding experience, according to some example embodiments. The network environment 600 includes an integrated finding experience machine 610, a database 620, and user devices 630 and 640, all communicatively coupled to each other via network 690. The integrated finding experience machine 610, the database 620, or both may form all or part of a network-based system (e.g., a network-based commerce system). The integrated finding experience machine 610 may be implemented in a computer system, as described below with respect to FIG. 9.

The database 620 is a data repository that stores information regarding one or more items (e.g., items available from one or more sellers). The information regarding the items may take the form of database records (e.g., a record for each item, documents (e.g., a webpage for each item), listings (e.g., a classified ad or auction listing for each item), or any suitable combination thereof.

The user devices 630 and 640 may include a display (e.g., an electronic graphical display) and may be associated with one or more users. A user may be a human user (e.g., a human being), a machine user (e.g., software program configured to interact with the user device 630), or any suitable combination thereof (e.g., a human assisted by a machine). For example, the user device 630 may be a deskside computer, a tablet computer, or a smart phone belonging to a user. Similarly, the user device 640 may be a tablet computer belonging to a different user.

Any of the machines, databases, or devices shown in FIG. 6 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database, a triple store, or any suitable combination thereof. Moreover, any two or more of the machines illustrated in FIG. 6 may be combined into a single machine, and the functions described herein for any single machine may be subdivided among multiple machines.

The network 690 may be any network that enables communication between machines (e.g., the integrated finding experience machine 610 and the user device 630). Accordingly, the network 690 may be a wired network, a wireless network, or any suitable combination thereof. The network 690 may include one or more portions that constitute a private network, a public network (e.g., the Internet), or any suitable combination thereof.

Figure 7:
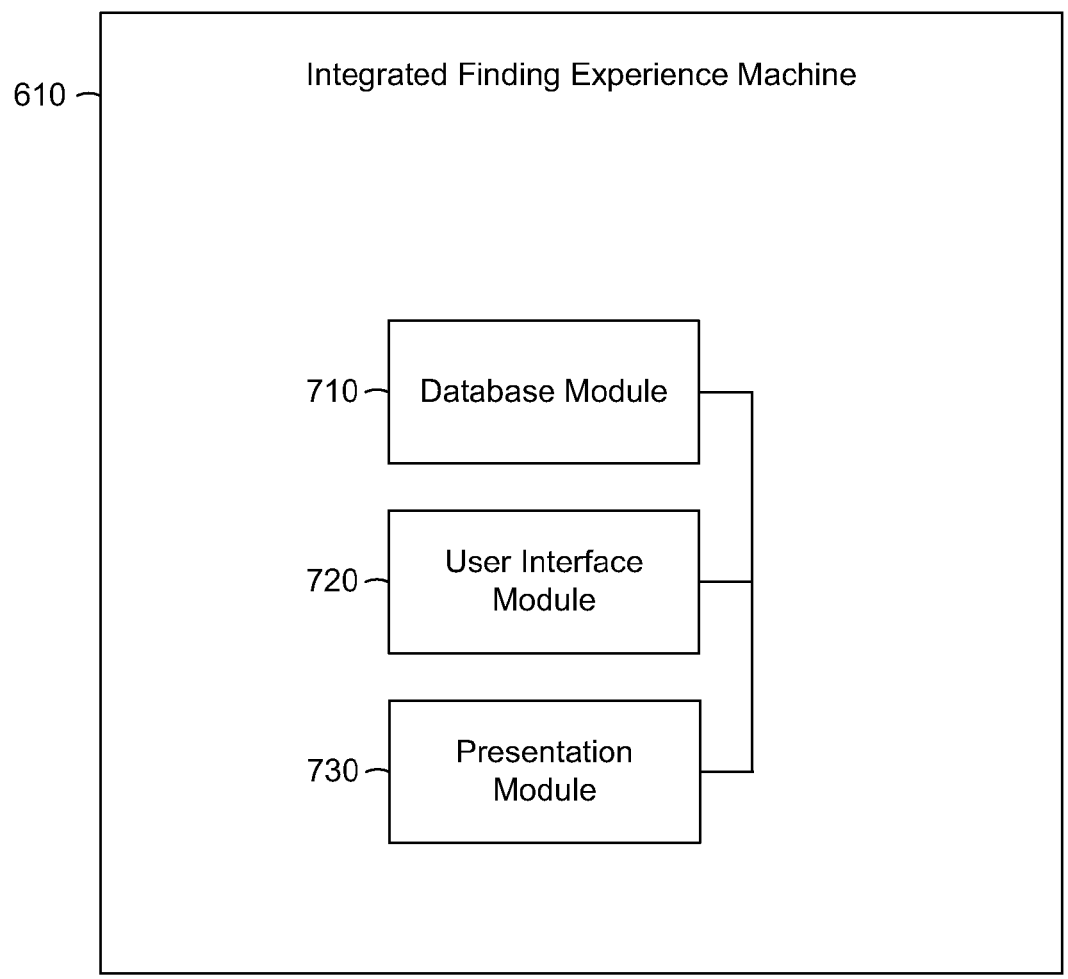
FIG. 7 is a block diagram illustrating components of an integrated finding experience machine, according to some example embodiments.

FIG. 7 is a block diagram illustrating components of the integrated finding experience machine 610, according to some example embodiments. The integrated finding experience machine 610 includes a database module 710, a user interface module 720, and a presentation module 730, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The database module 710 is configured to access the database 620, which stores information regarding items (e.g., items available from one or more sellers). Accordingly, the database module 710 may access the database 620 and hence access (e.g., obtain, read, or retrieve) the information regarding items, data records for one or more particular items, webpages (e.g., "view item" pages) for one or more particular items, listings for one or more particular items, advertisements for one or more particular items, or any suitable combination thereof, as stored in the database 620.

The user interface module 720 is configured to generate one or more of the views 100, 200, 300, 400, and 500 of the integrated finding experience, including any one or more of the elements contained therein. For example, the user interface module 720 may generate information that defines one or more of the views 100, 200, 300, 400, and 500 as all or part of a user interface (e.g., a graphical user interface). Moreover, the user interface module 720 may generate one or more of the views 100, 200, 300, 400, and 500 by outputting one or more instructions (e.g., HTML or XML code or a script), one or more documents (e.g., a web page written in a markup language), one or more portions of a document, or any suitable combination thereof, that, when processed by a user device (e.g., user device 630) causes the user device to display one or more of the views 100, 200, 300, 400, and 500. In addition, the user interface module 720 is configured to detect one or more cursor events (e.g., mouse over, mouse click, or touch) occurring on a user device (e.g., user device 630). For example, the user interface module 720 may be configured to communicate with the user device and to monitor (e.g., detect) one or more cursor events occurring thereon.

The presentation module 730 is configured to present one or more of the views 100, 200, 300, 400, and 500 of the integrated finding experience, as generated by the user interface module 720. The presentation module 730 may present a view (e.g., view 100) using a user device (e.g., using an electronic graphical display of the user device 630). In some example embodiments, the presentation module 730 communicates information that defines one or more of the views 100, 200, 300, 400, and 500 in the form of one or more instructions, one or more documents, one or more portions of a document, or any suitable combination thereof, to the user device (e.g., user device 630) for display by that user device. In certain example embodiments, the presentation module 730 provides the user device with a reference (e.g., an address) to one or more portions (e.g., elements) of the one or more views 100, 200, 300, 400, and 500 for retrieval by the user device (e.g., from the integrated finding experience machine 610, the database 620, or a server machine of an external website).

Figure 8:
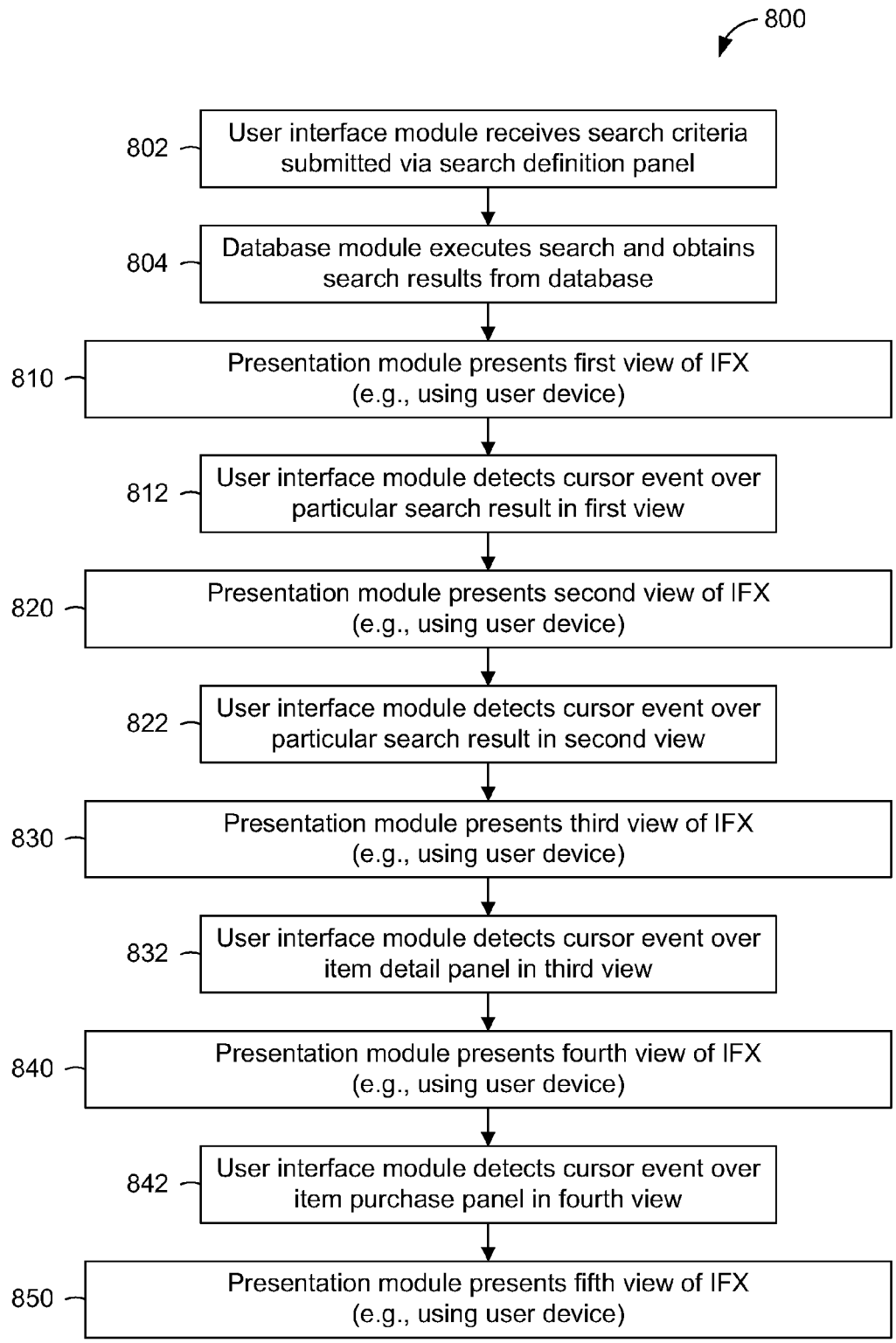
FIG. 8 is a flowchart illustrating operations in a method of providing an integrated finding experience, according to some example embodiments.

FIG. 8 is a flowchart illustrating operations 802-850 in a method 800 of providing an integrated finding experience, according to some example embodiments. One or more of the operations 802-850 may be performed by the integrated finding experience machine 610, using one or more of the modules described above with respect to FIG. 7.

As shown in FIG. 8, the method 800 includes operations 810, 820, 830, 840, and 850. Moreover, the method 800 may also include one or more of operations 802, 804, 812, 822, 832, and 842.

In operation 802, the user interface module 720 receives search criteria submitted via the search definition panel 110. The search definition panel 110 may be all or part of a user interface displayed by the user device 630. Accordingly, the user interface module 720 may receive the search criteria from the user device 630.

In operation 804, the database module 710 accesses the database 620 and performs (e.g., executes) a search of the database 620 and information contained therein using the search criteria received in operation 802. For example, the database module 710 may access and search information regarding items, data records for one or more particular items, webpages (e.g., "view item" pages) for one or more particular items, listings for one or more particular items, advertisements for one or more particular items, or any suitable combination thereof. In addition, in operation 804, the database module 720 obtains one or more search results (e.g., particular search result 121) from the database 620 that satisfy one or more of the search criteria.

In operation 810, the presentation module 730 presents the first view 100 of an integrated finding experience, using a user device (e.g., user device 630). For example, the presentation module 730 may provide the user device 630 with information that defines the view 100, as described above with respect to FIG. 7. Operation 810 may be performed in response to operation 802, operation 804, or both.

In operation 812, the user interface module 720 detects a cursor event (e.g., a mouse over, a mouse click, or a touch) over the particular search result 121 in the first view 100 of the integrated finding experience. The cursor event may correspond to a particular portion of the particular search result 121.

In operation 820, the presentation module 730 presents the second view 200 of the integrated finding experience, using the user device (e.g., user device 630). The presenting of the second view 200 may be in response to the cursor event detected in operation 812.

In operation 822, the user interface module 720 detects a cursor event (e.g., a mouse click or a touch) over the particular search result 121 in the second view 200 of the integrated finding experience. As above, the cursor event may correspond to a particular portion of the particular search result 121 (e.g., a "quick look" icon).

In operation 830, the presentation module 730 presents the third view 300 of the integrated finding experience, using the user device (e.g., user device 630). The presenting of the third view 300 may be in response to the cursor event detected in operation 822.

In operation 832, the user interface module 720 detects a cursor event (e.g., a mouse click or a touch) over the item detail panel 310 in the third view 300 of the integrated finding experience. For example, the cursor event may correspond to a particular portion of the item detail panel 310 (e.g., a magnifying glass icon).

In operation 840, the presentation module 730 presents the fourth view 400 of the integrated finding experience, using the user device (e.g., user device 630). The presenting of the fourth view 400 may be in response to the cursor event detected in operation 832.

In operation 842, the user interface module 720 detects a cursor event (e.g., a mouse click or a touch) over the item purchase panel 410 in the fourth view 400 of the integrated finding experience. For example, the cursor event may correspond to a particular portion of the item purchase panel 410 (e.g., ellipses).

In operation 850, the presentation module 730 presents the fifth view 500 of the integrated finding experience, using the user device (e.g., user device 630). The presenting of the fifth view 500 may be in response to the cursor event detected in operation 842.

According to various example embodiments, one or more of the methodologies described herein may facilitate communication of information about one or more items that are available for purchase from one or more sellers. In particular, one or more the methodologies described herein may constitute all or part of a business method (e.g., a business method implemented using a machine) that presents one or more users (e.g., potential buyers) with which information relating to the one or more items. Moreover, presentation of such information may be well-coordinated with respect to indications of interest by the one or more users (e.g., by one or more cursor events).

When these effects are considered in aggregate, one or more of the methodologies described herein may obviate a need for certain efforts or resources that otherwise would be involved in matching users (e.g., as potential purchasers) with products or specimens thereof that are likely to be of interest. Efforts expended by a user in identifying a product for purchase may be reduced by one or more of the methodologies described herein. Computing resources used by one or more machines, databases, or devices (e.g., within the network environment 600) may similarly be reduced. Examples of such computing resources include processor cycles, network traffic, memory usage, data storage capacity, power consumption, and cooling capacity.

Figure 9:
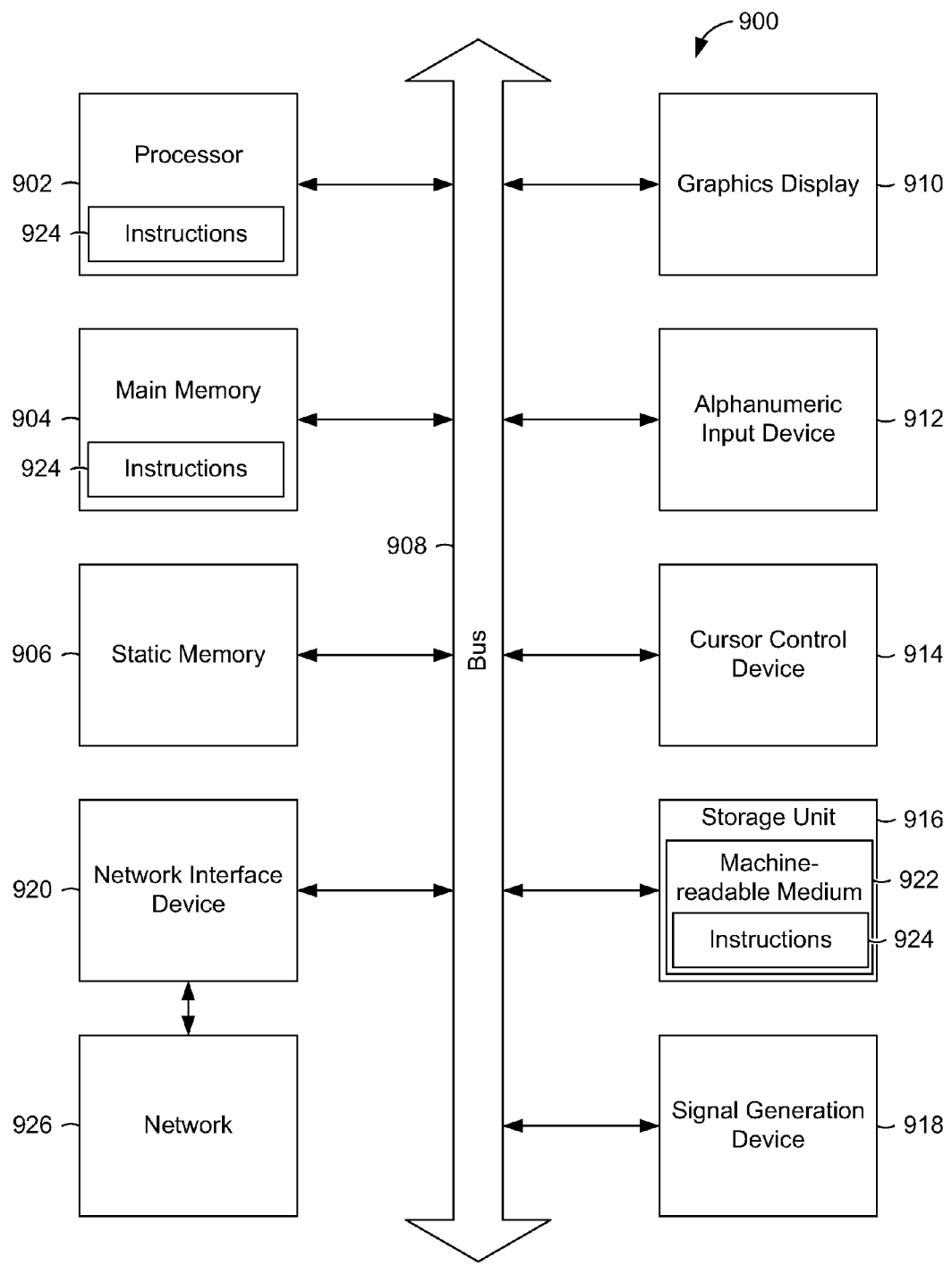
FIG. 9 is a block diagram illustrating components of a machine, according to some example embodiments, able to read instructions from a machine-readable medium and perform any one or more of the methodologies discussed herein.

FIG. 9 illustrates components of a machine 900, according to some example embodiments, that is able to read instructions from a machine-readable medium (e.g., a machine-readable storage medium) and perform any one or more of the methodologies discussed herein. Specifically, FIG. 9 shows a diagrammatic representation of the machine 900 in the example form of a computer system and within which instructions 924 (e.g., software) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 690) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., software) for execution by the machine, such that the instructions, when executed by one or more processors of the machine (e.g., processor 902), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods and systems (e.g., apparatus) discussed herein:

1. A method comprising:
presenting a first view of a graphical user interface, the first view including a first presentation of search results obtained from a database in response to a search defined by search criteria submitted via a search definition panel shown within the first view of the graphical user interface;
detecting a cursor event over a search result among the first presentation of search results presented in the first view of the graphical user interface;
presenting a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface, the presenting of the second view being performed by a processor of a machine.

2. The method of description 1, wherein:
the search result includes information that describes an item referenced by the search result over which the cursor event is detected; and
the item detail panel includes further information that describes the item referenced by the search result.

3. The method of description 1 or description 2, wherein:
the search result includes an image of an item referenced by the search result over which the cursor event is detected; and
the item detail panel includes a larger image of the item referenced by the search result.

4. The method of any of descriptions 1-3 further comprising:
receiving the search criteria from a user device via the search definition panel displayed by the user device; and wherein the presenting of the first view of the graphical interface is responsive to the receiving of the search criteria from the user device via the search definition panel.

5. The method of any of descriptions 1-4 further comprising:
executing the search defined by the search criteria submitted via the search definition panel; and wherein
the presenting of the first view of the graphical interface is responsive to the executing of the search defined by the search criteria submitted via the search definition panel.

6. The method of any of descriptions 1-5, wherein:
the cursor event is a first cursor event; and the method further comprises:
presenting an intermediate view of the graphical user interface in response to the detecting of the first cursor event, the intermediate view highlighting the search result over which the first cursor event is detected.

7. The method of description 6 further comprising:
detecting a second cursor event over the search result highlighted in the intermediate view of the graphical user interface presented in response to the first cursor event; and wherein
the presenting of the second view of the graphical user interface is in response to the detecting of the second cursor event over the search result highlighted in the intermediate view of the graphical user interface.

8. The method of any of descriptions 1-7, wherein:
the cursor event is a first cursor event; and the method further comprises:
detecting a second cursor event over the search result among the second presentation of the search results presented in the second view of the graphical user interface.

9. The method of description 8 further comprising:
presenting a third view of the graphical user interface in response to the detecting of the second cursor event over the search result, the third view including an item purchase panel that corresponds to the search result over which the first cursor event is detected and including a third presentation of the search results included in the first view of the graphical user interface, the third presentation of the search results being smaller in size than the second presentation of the search results and contemporaneously presented with the item purchase panel within the third view of the graphical user interface.

10. The method of description 9, wherein:
the item purchase panel is operable to initiate a purchase of an item that corresponds to the search result over which the first cursor event is detected.

11. The method of description 9 or description 10, wherein:
the item detail panel includes an image of an item referenced by the search result over which the first cursor event is detected; and
the item purchase panel includes a larger image of the item referenced by the search result.

12. The method of any of descriptions 10-11 further comprising:
detecting a third cursor event over a portion of the item purchase panel presented in the third view of the graphical user interface; and
presenting a fourth view of the graphical user interface, the fourth view contemporaneously presenting the item detail panel and a further item detail panel that corresponds to a further search result among the third presentation of the search results.

13. A non-transitory machine-readable storage medium comprising instructions that, when executed by one or more processors of a machine, cause the machine to perform operations comprising:
presenting a first view of a graphical user interface, the first view including a first presentation of search results obtained from a database in response to a search defined by search criteria submitted via a search definition panel shown within the first view of the graphical user interface;
detecting a cursor event over a search result among the first presentation of search results presented in the first view of the graphical user interface;
presenting a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface, the presenting of the second view being performed by the one or more processors of the machine.

14. The non-transitory machine-readable storage medium of description 13, wherein:
the cursor event is a first cursor event; and the operations further comprise:
detecting a second cursor event over the search result among the second presentation of the search results presented in the second view of the graphical user interface.

15. The non-transitory machine-readable storage medium of description 13 or description 14, wherein the operations further comprise:
presenting a third view of the graphical user interface in response to the detecting of the second cursor event over the search result, the third view including an item purchase panel that corresponds to the search result over which the first cursor event is detected and including a third presentation of the search results included in the first view of the graphical user interface, the third presentation of the search results being smaller in size than the second presentation of the search results and contemporaneously presented with the item purchase panel within the third view of the graphical user interface.

16. The non-transitory machine-readable storage medium of any of descriptions 13-15, wherein:
the search result includes an image of an item referenced by the search result over which the cursor event is detected; and
the item detail panel includes a larger image of the item referenced by the search result.

17. A system comprising:
a processor configured by a presentation module that configures the processor to present a first view of a graphical user interface, the first view including a first presentation of search results obtained from a database in response to a search defined by search criteria submitted via a search definition panel shown within the first view of the graphical user interface;
a user interface module configured to detect a cursor event over a search result among the first presentation of search results presented in the first view of the graphical user interface;
the processor being configured by the presentation module to present a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface.

18. The system of description 17, wherein:
the cursor event is a first cursor event; and
the user interface module is further configured to detect a second cursor event over the search result among the second presentation of the search results presented in the second view of the graphical user interface.

19. The system of description 17 or description 18, wherein:
the processor is further configured by the presentation module to present a third view of the graphical user interface in response to the detecting of the second cursor event over the search result, the third view including an item purchase panel that corresponds to the search result over which the first cursor event is detected and including a third presentation of the search results included in the first view of the graphical user interface, the third presentation of the search results being smaller in size than the second presentation of the search results and contemporaneously presented with the item purchase panel within the third view of the graphical user interface.

20. The system of any of description 17-19, wherein:
the search result includes an image of an item referenced by the search result over which the cursor event is detected; and
the item detail panel includes a larger image of the item referenced by the search result.

What is claimed is:

1. A method comprising:
by a presentation module comprising one or more processors of a machine, presenting a first view of a graphical user interface, the first view including a first presentation of search results obtained from a search defined by search criteria and including a search definition panel that depicts additional criteria selectable to refine the search results within the first view of the graphical user interface;
by a user interface module comprising one or more processors of the machine, detecting a cursor event over a search result among the first presentation of the search results presented in the first view of the graphical user interface;
by the presentation module comprising one or more processors of the machine and in response to the cursor event over the search result, presenting a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface, the presenting of the second view being performed by a processor of the machine and initiated by an animated transition from the first view to the second view, the animated transition expanding the item detail panel into view from an edge of the graphical user interface while sliding the first presentation of the search results away from the edge of the graphical user interface and shrinking the first presentation of the search results to become the second presentation of the search results and while shrinking the search definition panel to become a search refinement icon that depicts none of the additional criteria selectable to refine the search results, the search refinement icon formed from the shrunken search definition panel, the second presentation of the search results formed from the shrunken first presentation of the search results, and the item detail panel all being presented simultaneously in the second view of the graphical user interface;
by the user interface module comprising one or more processors of the machine, detecting a cursor event over the item detail panel presented in the second view of the graphical user interface; and
by the presentation module comprising one or more processors of the machine, presenting a third view of the graphical user interface in response to the detecting of the cursor event over the item detail panel, the third view including an item purchase panel that corresponds to the search result over which the cursor event over the search result among the first presentation of search results is detected and including a third presentation of the search results included in the first view of the graphical user interface, the third presentation of the search results being smaller in size than the second presentation of the search results and contemporaneously presented with the item purchase panel within the third view of the graphical user interface.

2. The method of claim 1, wherein:
the search result includes information that describes an item referenced by the search result over which the cursor event is detected; and
the item detail panel includes further information that describes the item referenced by the search result.

3. The method of claim 1, wherein:
the search result includes an image of an item referenced by the search result over which the cursor event is detected; and
the item detail panel includes a larger image of the item referenced by the search result.

4. The method of claim 1 further comprising:
receiving the search criteria from a user device via the search definition panel displayed by the user device; and wherein
the presenting of the first view of the graphical interface is responsive to the receiving of the search criteria from the user device via the search definition panel.

5. The method of claim 1 further comprising:
executing the search defined by the search criteria submitted via the search definition panel; and wherein
the presenting of the first view of the graphical interface is responsive to the executing of the search defined by the search criteria submitted via the search definition panel.

6. The method of claim 1, wherein:
the cursor event over the search result among the first presentation of search results is a first cursor event; and
the method further comprises:
presenting an intermediate view of the graphical user interface in response to the detecting of the first cursor event, the intermediate view highlighting the search result over which the first cursor event is detected.

7. The method of claim 6 further comprising:
detecting a second cursor event over the search result highlighted in the intermediate view of the graphical user interface presented in response to the first cursor event; and wherein
the presenting of the second view of the graphical user interface is in response to the detecting of the second cursor event over the search result highlighted in the intermediate view of the graphical user interface.

8. The method of claim 1, wherein:
the item purchase panel is operable to initiate a purchase of an item that corresponds to the search result over which the cursor event over the search result among the first presentation of search results is detected.

9. The method of claim 1, wherein:
the item detail panel, when presented in the second view of the graphical user interface, includes an image of an item referenced by the search result over which the first cursor event is detected; and
the item purchase panel, when presented in the third view of the graphical user interface, includes a larger image of the item referenced by the search result.

10. The method of claim 1 further comprising:
detecting a cursor event over a portion of the item purchase panel presented in the third view of the graphical user interface; and
presenting a fourth view of the graphical user interface, the fourth view contemporaneously presenting the item detail panel and a further item detail panel that corresponds to a further search result among the third presentation of the search results.

11. A non-transitory machine-readable storage medium comprising instructions that, when executed by one or more processors of a machine, cause the machine to perform operations comprising:
by a presentation module comprising one or more processors of the machine, presenting a first view of a graphical user interface, the first view including a first presentation of search results obtained from a search defined by search criteria and including a search definition panel that depicts additional criteria selectable to refine the search results within the first view of the graphical user interface;
by a user interface module comprising one or more processors of the machine, detecting a cursor event over a search result among the first presentation of the search results presented in the first view of the graphical user interface;
by the presentation module comprising one or more processors of the machine and in response to the cursor event over the search result, presenting a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface, the presenting of the second view being performed by a processor of the machine and initiated by an animated transition from the first view to the second view, the animated transition expanding the item detail panel into view from an edge of the graphical user interface while sliding the first presentation of the search results away from the edge of the graphical user interface and shrinking the first presentation of the search results to become the second presentation of the search results and while shrinking the search definition panel to become a search refinement icon that depicts none of the additional criteria selectable to refine the search results, the search refinement icon formed from the shrunken search definition panel, the second presentation of the search results formed from the shrunken first presentation of the search results, and the item detail panel all being presented simultaneously in the second view of the graphical user interface;
by the user interface module comprising one or more processors of the machine, detecting a cursor event over the item detail panel presented in the second view of the graphical user interface; and
by the presentation module comprising one or more processors of the machine, presenting a third view of the graphical user interface in response to the detecting of the cursor event over the item detail panel, the third view including an item purchase panel that corresponds to the search result over which the cursor event over the search result among the first presentation of search results is detected and including a third presentation of the search results included in the first view of the graphical user interface, the third presentation of the search results being smaller in size than the second presentation of the search results and contemporaneously presented with the item purchase panel within the third view of the graphical user interface.

12. The non-transitory machine-readable storage medium of claim 11, wherein:
the search result includes an image of an item referenced by the search result over which the cursor event is detected; and
the item detail panel includes a larger image of the item referenced by the search result.

13. A system comprising:
a presentation module comprising one or more processors and configured to present a first view of a graphical user interface, the first view including a first presentation of search results obtained from a search defined by search criteria and including a search definition panel that depicts additional criteria selectable to refine the search results within the first view of the graphical user interface; and
a user interface module comprising one or more processors and configured to detect a cursor event over a search result among the first presentation of the search results presented in the first view of the graphical user interface;
the presentation module comprising one or more processors being further configured to present a second view of the graphical user interface, the second view including an item detail panel that corresponds to the search result over which the cursor event is detected and including a second presentation of the search results included in the first view of the graphical user interface, the second presentation of the search results being smaller in size than the first presentation of the search results and contemporaneously presented with the item detail panel within the second view of the graphical user interface, and, the presenting of the second view being performed by a processor of the system and initiated by an animated transition from the first view to the second view, the animated transition expanding the item detail panel into view from an edge of the graphical user interface while sliding the first presentation of the search results away from the edge of the graphical user interface and shrinking the first presentation of the search results to become the second presentation of the search results and while shrinking the search definition panel to become a search refinement icon that depicts none of the additional criteria selectable to refine the search results, the search refinement icon formed from the shrunken search definition panel, the second presentation of the search results formed from the shrunken first presentation of the search results, and the item detail panel all being presented simultaneously in the second view of the graphical user interface;

the user interface module comprising one or more processors being further configured to detect a cursor event over the item detail panel presented in the second view of the graphical user interface; and the presentation module comprising one or more processors being further configured to present a third view of the graphical user interface in response to the detecting of the cursor event over the item detail panel, the third view including an item purchase panel that corresponds to the search result over which the cursor event over the search result among the first presentation of search results is detected and including a third presentation of the search results included in the first view of the graphical user interface, the third presentation of the search results being smaller in size than the second presentation of the search results and contemporaneously presented with the item purchase panel within the third view of the graphical user interface.

14. The system of claim 13, wherein:

the search result includes an image of an item referenced by the search result over which the cursor event is detected; and the item detail panel includes a larger image of the item referenced by the search result.

* * * * *